(12) United States Patent
Okamae et al.

(10) Patent No.: US 11,502,626 B2
(45) Date of Patent: Nov. 15, 2022

(54) PIEZOELECTRIC MOTOR AND ROBOT

(71) Applicant: SEIKO EPSON CORPORATION, Tokyo (JP)

(72) Inventors: Yudai Okamae, Chino (JP); Tomohisa Iwazaki, Shimosuwa-Machi (JP); Yutaka Arakawa, Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 129 days.

(21) Appl. No.: 17/152,815

(22) Filed: Jan. 20, 2021

(65) Prior Publication Data

US 2021/0226560 A1 Jul. 22, 2021

(30) Foreign Application Priority Data

Jan. 21, 2020 (JP) .............................. JP2020-007406

(51) Int. Cl.
*H02N 2/12* (2006.01)
*H02N 2/10* (2006.01)

(52) U.S. Cl.
CPC ............... *H02N 2/12* (2013.01); *H02N 2/103* (2013.01)

(58) Field of Classification Search
CPC ........ H02N 2/12; H02N 2/103; H02N 2/0055; H02N 2/004
See application file for complete search history.

(56) References Cited

U.S. PATENT DOCUMENTS

2011/0255185 A1* 10/2011 Hashi ....................... G02B 7/08
359/824
2018/0287514 A1 10/2018 Iwazaki et al.

FOREIGN PATENT DOCUMENTS

| JP | 2013240172 A | 11/2013 |
| JP | 2016019354 A | 2/2016 |
| JP | 2018174620 A | 11/2018 |

\* cited by examiner

*Primary Examiner* — Emily P Pham
(74) *Attorney, Agent, or Firm* — Yu Gang

(57) ABSTRACT

A piezoelectric motor includes a piezoelectric actuator, a holding member that holds the piezoelectric actuator, a housing in which the piezoelectric actuator and the holding member are placed, a first positioning pin that positions the holding member and the housing, and a first fixing part that fixes the first positioning pin. In the piezoelectric motor, the first positioning pin is fixed to one of the holding member and the housing, and a first hole portion in which the first positioning pin is placed is provided in the other of the holding member and the housing. The first fixing part fixes relative positions of the first hole portion and the first positioning pin.

7 Claims, 13 Drawing Sheets

PIEZOELECTRIC MOTOR AND ROBOT

The present application is based on, and claims priority from JP Application Serial Number 2020-007406, filed Jan. 21, 2020, the disclosure of which is hereby incorporated by reference herein in its entirety.

BACKGROUND

1. Technical Field

The present disclosure relates to a piezoelectric motor and a robot.

2. Related Art

JP-A-2016-19354 discloses an ultrasonic motor including a vibrator, a holding member that holds the vibrator, and a ring member that holds the holding member. A shaft portion is provided in the holding member and a hole portion that receives the shaft portion is formed in the ring member. The holding member is positioned relative to the ring member to be movable forward and backward along the shaft portion. That is, the shaft portion is clearance-fitted in the hole portion of the ring member.

However, the shaft portion and the hole portion repeatedly contact by positioning by clearance fitting, and thereby, unwanted vibration may be generated and drive power of the vibrator may be lowered.

SUMMARY

A piezoelectric motor includes a vibrator, a holding unit that holds the vibrator, a housing in which the vibrator and the holding unit are placed, a first positioning pin that positions the holding unit and the housing, and a first fixing part that fixes the first positioning pin, and in the piezoelectric motor, the first positioning pin is fixed to one of the holding unit and the housing, a first hole portion in which the first positioning pin is placed is provided in the other of the holding unit and the housing, and the first fixing part fixes relative positions of the first hole portion and the first positioning pin.

A robot includes the above described piezoelectric motor.

DESCRIPTION OF EXEMPLARY EMBODIMENTS

1. Embodiment 1

Figure 1:
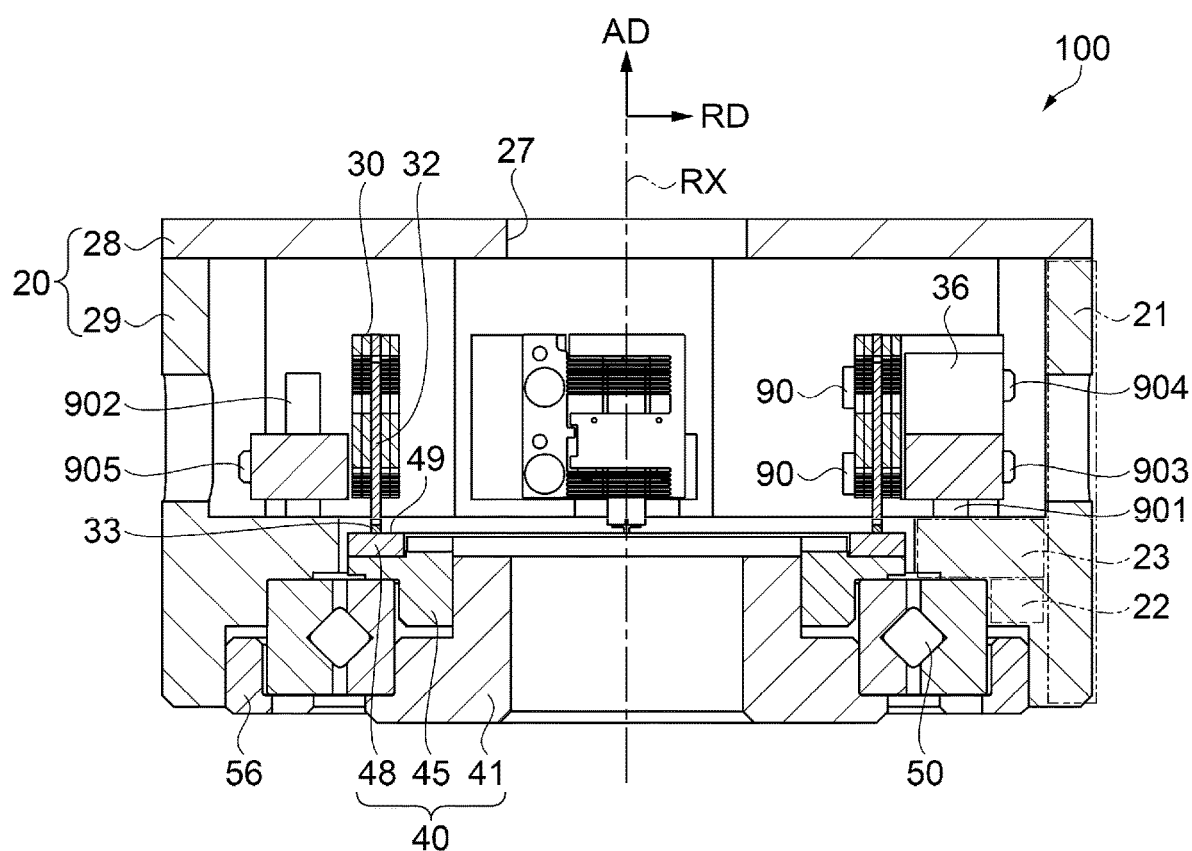
FIG. 1 is a side sectional view showing a schematic configuration of a piezoelectric motor in Embodiment 1.
Figure 2:
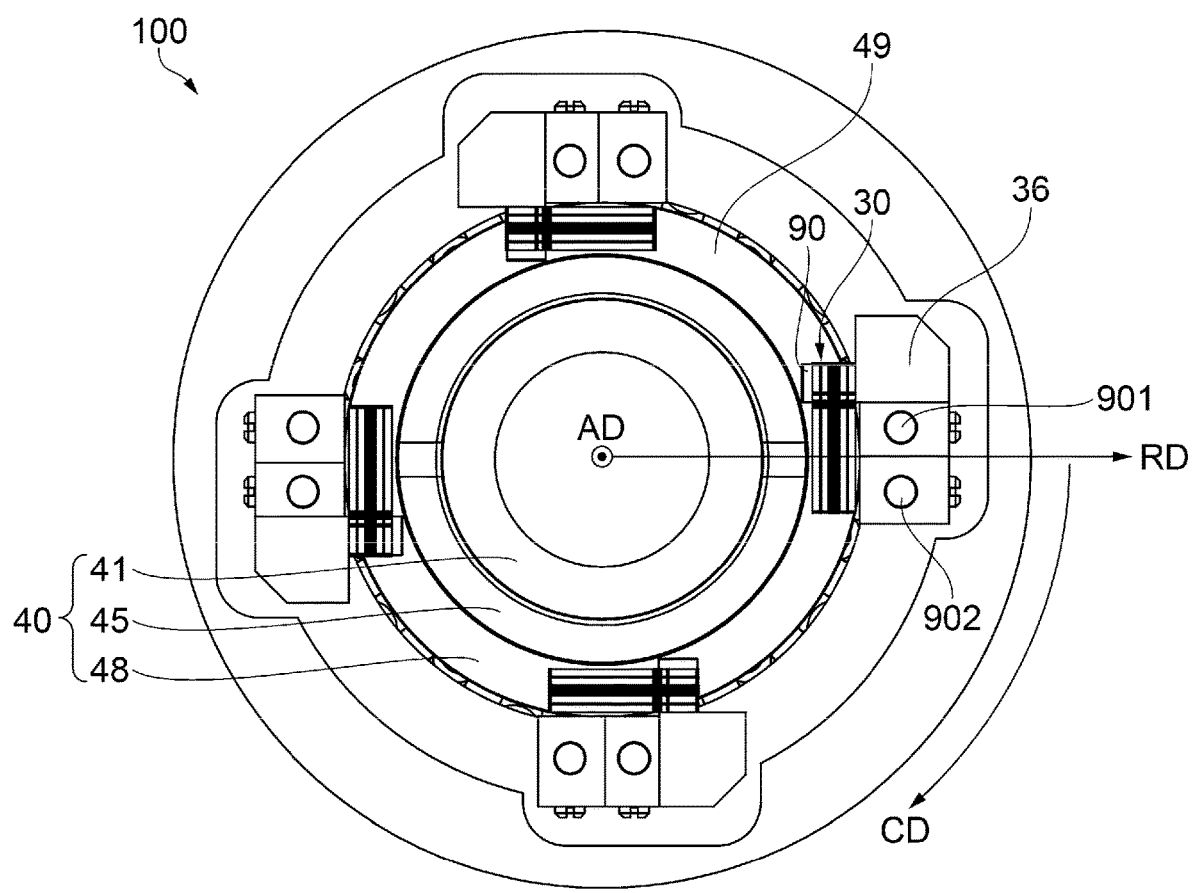
FIG. 2 is a plan view showing an internal configuration of the piezoelectric motor in Embodiment 1.

FIG. 1 is a side sectional view showing a schematic configuration of a piezoelectric motor 100 in Embodiment 1. FIG. 2 is a plan view showing an internal configuration of the piezoelectric motor 100 in Embodiment 1. The piezoelectric motor 100 in the embodiment includes a housing 20 that defines the outer shape of the piezoelectric motor 100, a piezoelectric actuator 30 as a vibrator housed inside of the housing 20, a rotor 40 driven by the piezoelectric actuator 30, and a bearing 50 that rotatably supports the rotor 40. The piezoelectric actuator 30 includes a piezoelectric element 32 and rotates the rotor 40 using two-dimensional deformation of the piezoelectric element 32. The rotation of the rotor 40 is transmitted to the outside of the piezoelectric motor 100 via a rotation shaft 41. The piezoelectric motor 100 may include an encoder that detects the rotation direction, the rotation angle, the rotation speed of the rotor 40 relative to the housing 20. The encoder may be an optical encoder or a magnetic encoder. Note that the piezoelectric motor 100 may be referred to as "piezoelectric drive device" or "ultrasonic motor". The rotor 40 may be referred to as "driven unit".

The housing 20 includes a lower case 29 and a lid part 28. The lower case 29 includes a cylindrical side surface portion 21, an annular first step portion 22 formed in the inner circumferential surface of the side surface portion 21, and an annular second step portion 23 in contact with the first step portion 22 and similarly formed in the inner circumferential surface of the side surface portion 21. In the embodiment, the side surface portion 21, the first step portion 22, and the second step portion 23 are integrally formed, but, may be separately formed. The first step portion 22 is located at the downside of the second step portion 23. The inner diameter of the first step portion 22 is larger than the inner diameter of the second step portion 23. The lower end surface of the first step portion 22 is located at the upside of the lower end surface of the side surface portion 21, and the upper end surface of the second step portion 23 is located at the downside of the upper end surface of the side surface portion 21. The bearing 50 is attached in contact with the inner circumferential surface of the first step portion 22 and the lower end surface of the second step portion 23. The piezoelectric actuator 30 is held by a holding member 36 as a holding unit and attached to the upper end surface of the second step portion 23 via a first positioning pin 901 and a second positioning pin 902 for positioning of the holding member 36 and the housing 20. The details of the attachment of the bearing 50 and the piezoelectric actuator 30 will be described later. The bearing 50, the rotor 40, and the piezoelectric actuator 30 are attached to the lower case 29, and then, the lid part 28 is attached to the upper end portion of the side surface portion 21 of the lower case 29 by screws. A through hole 27 for passage of wires etc. is provided in the lid part 28.

The piezoelectric actuator 30 is placed inside of the housing 20 with the holding member 36 and fixed to the second step portion 23. The piezoelectric actuator 30 includes the above described piezoelectric element 32 and a tip end portion 33 facing a contacted surface 49 (see FIG. 2) of the rotor 40. An alternating-current voltage is supplied to the piezoelectric element 32, and thereby, the piezoelectric element 32 deforms and the tip end portion 33 vibrates in an elliptical trajectory. The tip end portion 33 repeatedly contacts the contacted surface 49 of the rotor 40 by the vibration and provides a drive force to the rotor 40. Note that the specific configuration and motion of the piezoelectric actuator 30 will be described later.

FIG. 2 is the plan view showing the internal configuration of the piezoelectric motor 100, and shows the position relationship between the piezoelectric actuator 30 and the rotor 40 as seen from the lid part 28 downward. Four of the piezoelectric actuators 30 are provided in the piezoelectric motor 100 in the embodiment. The four piezoelectric actuators 30 are placed at equal intervals. Note that the number of piezoelectric actuators 30 provided in the piezoelectric motor 100 is not limited to four, and may be one to three, five, or more. The piezoelectric actuators 30 may not necessarily be placed at equal intervals.

The rotor 40 has the above described rotation shaft 41, a transmitting member 45 placed on the outer circumference of the rotation shaft 41 and coupled to the rotation shaft 41, and a high-hardness portion 48 placed on the outer circumference of the rotation shaft 41 and coupled to the transmitting member 45. In the embodiment, the rotor 40 has the cylindrical rotation shaft 41 rotatable around a center axis RX. That is, the rotor 40 has the rotation shaft 41 that is hollow. Note that the rotor 40 may have the rotation shaft 41 that is solid. A direction from the lower case 29 toward the lid part 28 along the center axis RX of the rotation shaft 41 of the rotor 40 is referred to as "axial direction AD" and a direction orthogonal to the center axis RX of the rotation shaft 41 and outward from the center axis RX is referred to as "radial direction RD". Further, the rotation direction of the rotor 40 is referred to as "circumferential direction CD". These directions AD, RD, CD are shown as appropriate in the respective drawings.

Figure 3:
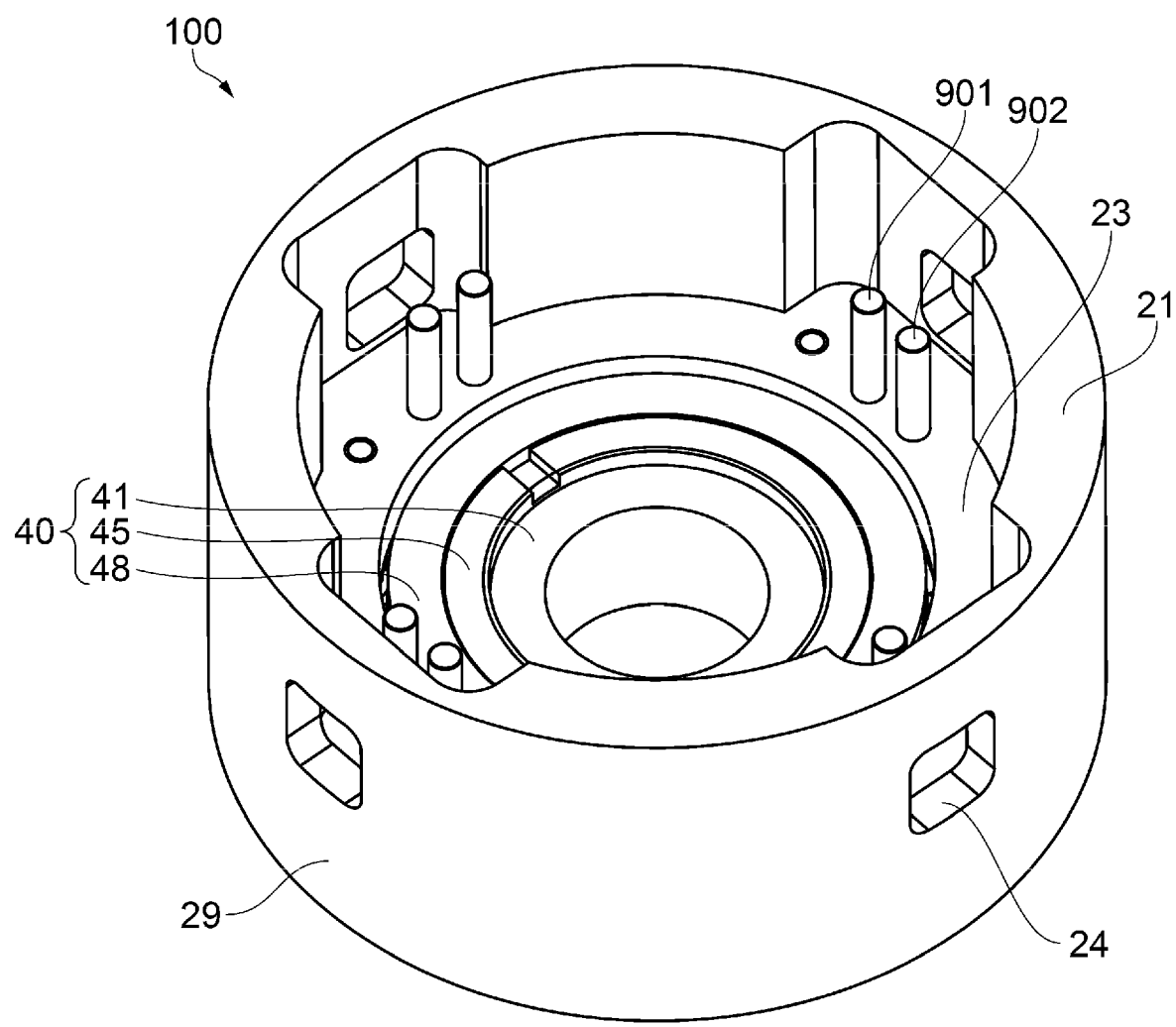
FIG. 3 is a perspective view of the piezoelectric motor in Embodiment 1 as seen from above.

FIG. 3 is a perspective view of the piezoelectric motor 100 as seen from above. Here, the lid part 28, the piezoelectric actuators 30, and the holding members 36 are not shown. The second step portion 23 has the single first positioning pin 901 and the single second positioning pin 902 for each piezoelectric actuator 30. The center axis of the first positioning pin 901 and the center axis of the second positioning pin 902 are each parallel to the axial direction AD. In the embodiment, a hole having a diameter slightly smaller than the diameter of the first positioning pin 901 is bored in the second step portion 23 and the first positioning pin 901 is driven and fixed in the hole with a hammer or the like. That is, the first positioning pin 901 is fixed into the second step portion 23 by interference fit. The second positioning pin 902 is also fixed into the second step portion 23 by interference fit like the first positioning pin 901. Note that the fixing method is not limited to driving, and includes using an adhesive, using a filling, or screwing by a male thread and a female thread. Or, the first positioning pin 901 and the second positioning pin 902 may be integrally molded with the lower case 29, not separately formed from the lower case 29.

Figure 4:
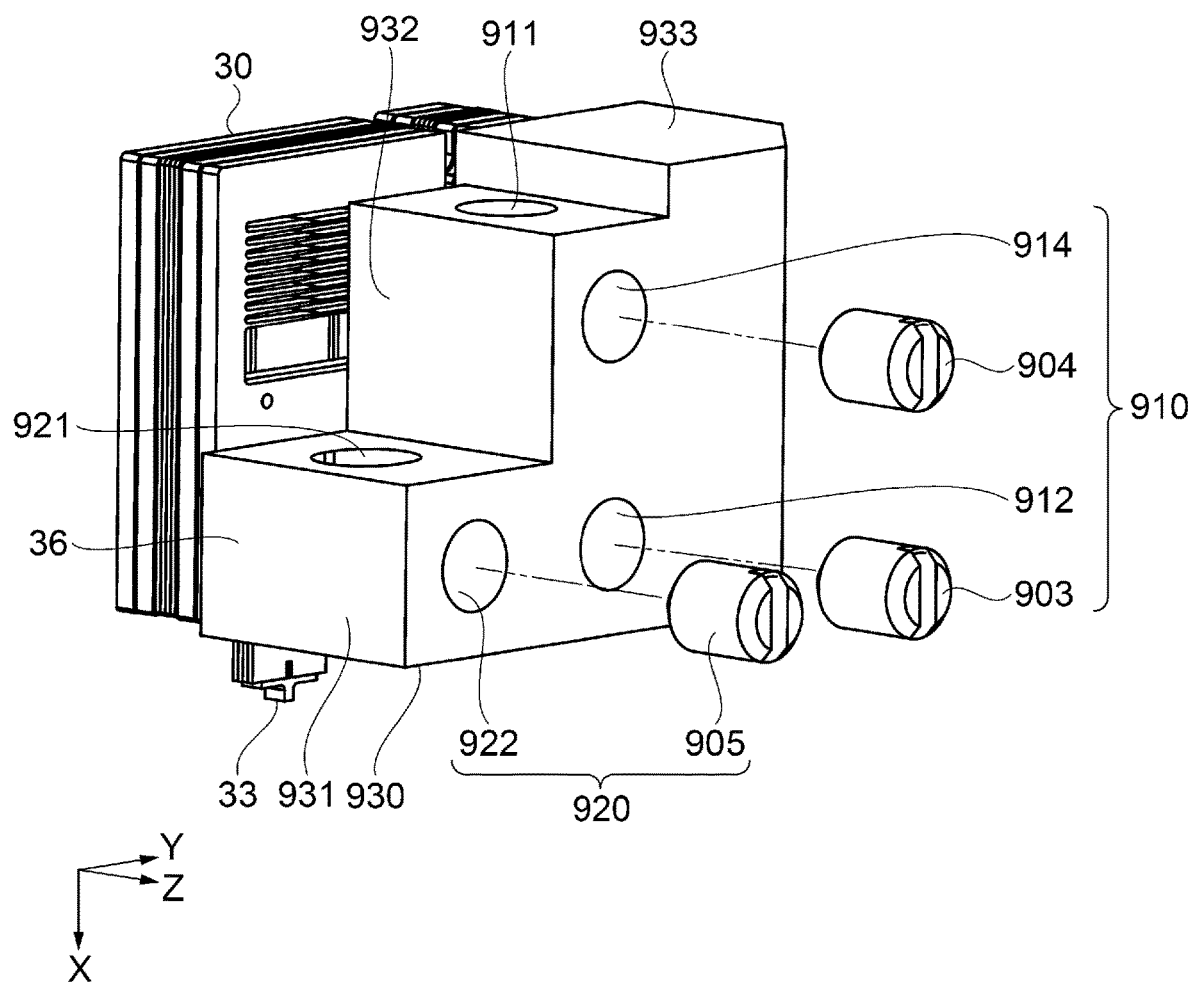
FIG. 4 is a perspective view of a piezoelectric actuator and a holding member in Embodiment 1 as seen from above.

FIG. 4 is a perspective view of the piezoelectric actuator 30 and the holding member 36 as seen from above. Arrows along X, Y, Z directions orthogonal to one another are shown in FIG. 4. The X direction is a direction parallel to the axial direction AD shown in FIGS. 1 and 2, and the Z direction is a direction parallel to the radial direction RD shown in FIGS. 1 and 2. These directions X, Y, Z are shown as appropriate in the respective drawings. In the embodiment, the piezoelectric actuator 30 is fixed to the holding member 36 by fixing screws 90 (see FIG. 1). Note that the fixing method is not limited to using the screws, and may be using an adhesive or the like or a combination thereof.

The holding member 36 has a triple stepped shape. With a bottom surface 930 parallel to the YZ plane as a common bottom surface, a first step portion 931, a second step portion 932, and a third step portion 933 are sequentially placed toward the +Y direction. In the embodiment, the third step portion 933 is higher than the second step portion 932 and the second step portion 932 is higher than the first step portion 931. The piezoelectric actuator 30 is fixed to the third step portion 933. The heights of the first step portion 931 and the second step portion 932 are lower than the height of the third step portion 933, and thereby, the step portions do not interfere with wiring (not shown) of the piezoelectric actuator 30. Further, the height of the first step portion 931 is lower than the height of the second step portion 932, and thereby, an influence by double-fit when both the first positioning pin 901 and the second positioning pin 902 are inserted into both a first hole portion 911 and a fourth hole portion 921, which will be described later, may be reduced. That is, a potential that the first positioning pin 901 and the second positioning pin 902 not strictly in parallel are caught by and not entered into the first hole portion 911 and the fourth hole portion 921 also not strictly in parallel may be reduced.

In the second step portion 932, the first hole portion 911 in which the first positioning pin 901 is to be placed is provided. The first hole portion 911 penetrates the second step portion 932 in the X direction. The diameter of the first hole portion 911 is slightly larger than the diameter of the first positioning pin 901. In the second step portion 932, a second hole portion 912 being parallel to the Z direction and communicating with the first hole portion 911 is formed. Further, a female thread is formed in the inner circumferential surface of the second hole portion 912. To the inside of the second hole portion 912, a first male screw 903 as a first screw portion is attached. In the embodiment, a third hole portion 914 being parallel to the Z direction and communicating with the first hole portion 911 is formed in the second step portion 932. Further, a female thread is formed in the inner circumferential surface of the third hole portion 914. To the inside of the third hole portion 914, a second male screw 904 as a second screw portion is attached. In the embodiment, the second hole portion 912 and the third hole portion 914 are parallel to the Z direction, but, may be along any direction as long as the hole portions may communicate with the first hole portion 911 and the female threads may be formed therein. The second hole portion 912, the first male screw 903, the third hole portion 914, and the second male screw 904 function as a first fixing part 910 that fixes the first positioning pin 901.

In the first step portion 931, the fourth hole portion 921 in which the second positioning pin 902 is placed is provided. The fourth hole portion 921 penetrates the first step portion 931 in the X direction. The diameter of the fourth hole portion 921 is slightly larger than the diameter of the second positioning pin 902. In both directions of the Y direction and the Z direction, the relative position of the fourth hole portion 921 to the first hole portion 911 is equal to the relative position of the second positioning pin 902 to the first positioning pin 901. That is, the first positioning pin 901 is inserted into the first hole portion 911 and the second positioning pin 902 is inserted into the fourth hole portion 921, and thereby, the holding member 36 may be coupled to the lower case 29 movably forward and backward in the X direction. In the embodiment, in the first step portion 931, a fifth hole portion 922 being parallel to the Z direction and communicating with the fourth hole portion 921 is formed. Further, a female thread is formed in the inner circumferential surface of the fifth hole portion 922. A third male screw 905 as a third screw portion is attached to the fifth hole portion 922. In the embodiment, the fifth hole portion 922 is parallel to the Z direction, but, may be along any direction as long as the hole portion may communicate with the fourth hole portion 921 and the female thread may be formed therein. The fifth hole portion 922 and the third male screw 905 function as a second fixing part 920 that fixes the second positioning pin 902. Note that an opening 24 for attachment of the first male screw 903, the second male screw 904, and the third male screw 905 to the holding member 36 is formed in the side surface portion 21 of the lower case 29.

When the holding member 36 with the piezoelectric actuator 30 attached thereto in advance is coupled to the lower case 29 via the first positioning pin 901 and the second positioning pin 902, as shown in FIG. 1, the tip end portion 33 of the piezoelectric actuator 30 contacts the contacted surface 49 of the rotor 40 and an urging force is generated. The urging force is essential to operate the piezoelectric motor 100 by the piezoelectric actuator 30, but, the holding member 36 is movable forward and backward in the X direction relative to the lower case 29 and thereby the urging force is not maintained as it is. Accordingly, in the embodiment, the first positioning pin 901 is pressed against the first hole portion 911 and tightened up by the first male screw 903 and the second male screw 904, and thereby, the relative positions of the first positioning pin 901 and the first hole portion 911 are fixed. That is, the first fixing part 910 fixes the relative positions of the first positioning pin 901 and the first hole portion 911. Thereby, the urging force may be maintained. In addition, unwanted vibration generated by the gap between the first positioning pin 901 and the first hole portion 911 may be suppressed and reduction of the drive force by the piezoelectric motor 100 may be prevented. Further, the degree of freedom of the holding member 36 in the rotation direction generated by the gap between the first positioning pin 901 and the first hole portion 911 and the gap between the second positioning pin 902 and the second hole portion 912 may be restricted in the two directions about the Y-axis and the Z-axis. That is, rattling may be reduced and the posture of the piezoelectric actuator 30 may be stabilized. Furthermore, in the embodiment, the second positioning pin 902 is pressed against the fourth hole portion 921 and tightened up by the third male screw 905, and thereby, the relative positions of the second positioning pin 902 and the fourth hole portion 921 are fixed. That is, the second fixing part 920 fixes the relative positions of the second positioning pin 902 and the fourth hole portion 921. Thereby, of the degrees of freedom in the above described rotation directions, the remaining direction about the X-axis may be restricted. That is, the rattling may be further reduced and the posture of the piezoelectric actuator 30 may be further stabilized. Note that, in the embodiment, the fixation of the relative positions of the first positioning pin 901 and the first hole portion 911 is realized by tightening of the first male screw 903 and the second male screw 904 and the fixation of the relative positions of the second positioning pin 902 and the fourth hole portion 921 is realized by tightening of the third male screw 905, but, the fixation may be realized by placement of adhesives, fillings, or the like within the first hole portion 911 and the fourth hole portion 921. That is, these adhesives, fillings, or the like contact both the first positioning pin 901 and the first hole portion 911 and contact both the second positioning pin 902 and the fourth hole portion 921, and thereby, the respective relative positions are fixed. In this case, the first fixing part 910 and the second fixing part 920 contain those adhesives, fillings, or the like. A method of adjusting the urging force in the piezoelectric actuator 30 of the embodiment will be described later.

The transmitting member 45 receives the drive force from the tip end portion 33 of the piezoelectric actuator 30 and transmits the drive force to the rotation shaft 41. The transmitting member 45 has a shape formed by a combination of a cylindrical portion around the center axis RX and a flange portion around the center axis RX. The cylindrical portion of the transmitting member 45 is coupled to the outer circumferential side surface of the rotation shaft 41.

The high-hardness portion 48 is placed between the tip end portion 33 of the piezoelectric actuator 30 and the transmitting member 45. The high-hardness portion 48 has an annular shape around the center axis RX. The high-hardness portion 48 is bonded to the flange portion of the transmitting member 45 using an insulating adhesive. In the high-hardness portion 48, the contacted surface 49 to be contacted by the tip end portion 33 of the piezoelectric actuator 30 is provided. In the embodiment, the high-hardness portion 48 is formed using a ceramic material. More specifically, the high-hardness portion 48 is formed using alumina (aluminum oxide). Note that, as the ceramic material forming the high-hardness portion 48, not only alumina but also e.g. zirconia or barium titanate may be used. The high-hardness portion 48 may be formed using a metallic material. As the metallic material forming the high-hardness portion 48, e.g. a cemented carbide alloy, high-speed steel, alloy tool steel, or the like may be used. The transmitting member 45 and the high-hardness portion 48 may be fixed to each other by screws, bonding, diffusion joining, or the like. A groove may be formed in the transmitting member 45 and the high-hardness portion 48 may be fitted in the groove.

The bearing 50 is provided between the rotation shaft 41 of the rotor 40 and the first step portion 22 of the housing 20. The bearing 50 supports the rotor 40 rotatably relative to the housing 20. In the embodiment, as the bearing 50, a roller bearing having an annular shape around the center axis RX is used. The bearing 50 may be e.g. a ball bearing, not the roller bearing. The rotor 40 is supported by the bearing 50, and thereby, the rotor 40 may smoothly rotate around the center axis RX.

The outer ring of the bearing 50 is sandwiched by a supporting member 56 and the second step portion 23 of the housing 20. The supporting member 56 has an annular shape around the center axis RX. The section of the supporting member 56 perpendicular to the circumferential direction CD has an L-shape. In the embodiment, threaded portions are provided in each of the outer circumferential side surface of the supporting member 56 and the inner circumferential side surface of the side surface portion 21 of the housing 20 and the threaded portions are fitted, and thereby, the supporting member 56 is fixed to the side surface portion 21.

The inner ring of the bearing 50 is sandwiched by the transmitting member 45 and the rotation shaft 41. In the embodiment, threaded portions are provided in each of the outer circumferential side surface of the rotation shaft 41 of the rotor 40 and the inner circumferential side surface of the transmitting member 45 and the threaded portions are fitted, and thereby, the transmitting member 45 is fixed to the rotation shaft 41.

As shown in FIG. 1, the rotor 40 is rotatably attached to the lower case 29 using the bearing 50 and the supporting member 56, and then, as shown in FIG. 4, the holding member 36 with the piezoelectric actuator 30 previously attached thereto is attached to the lower case 29.

Figure 5:
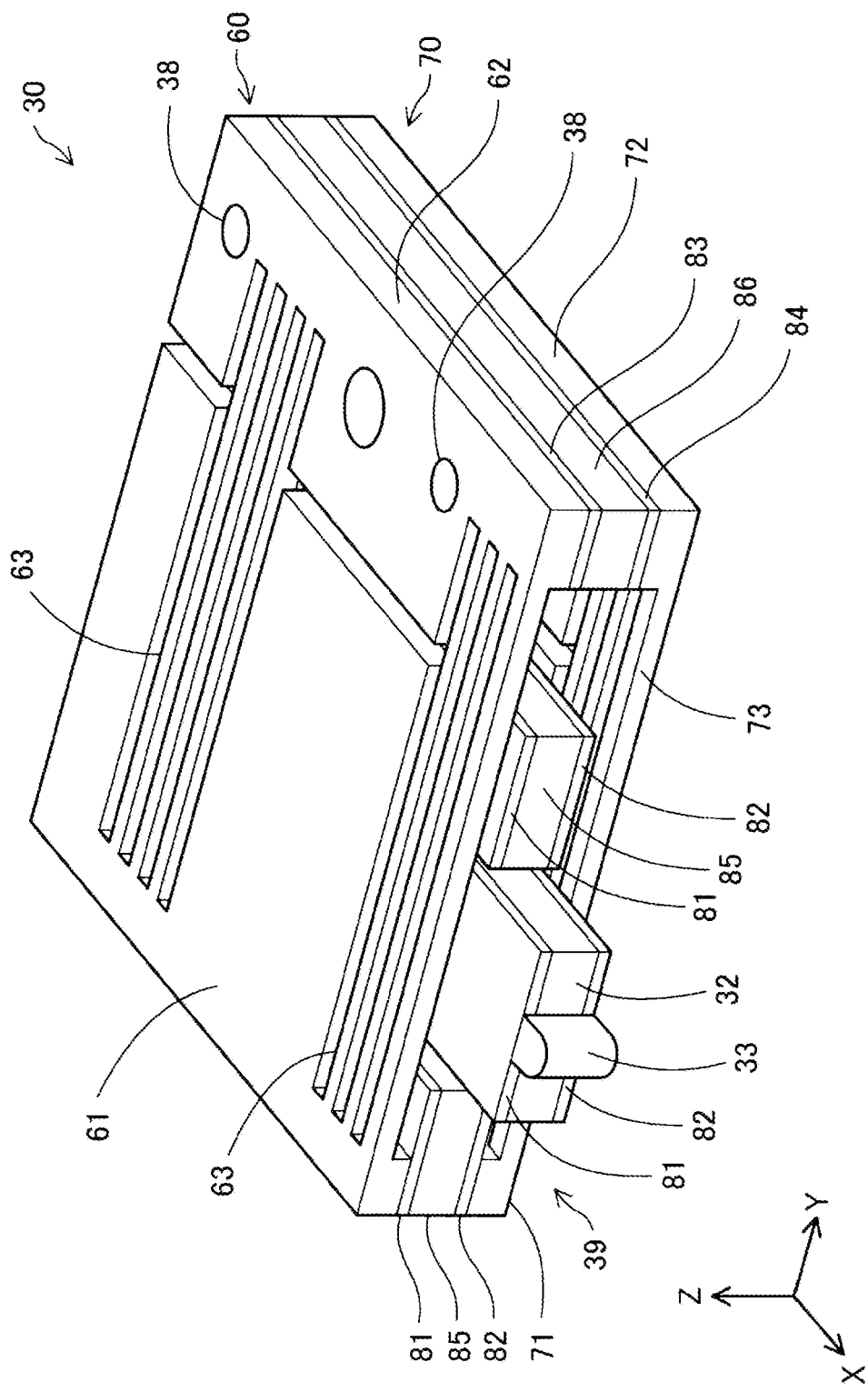
FIG. 5 is a perspective view showing a configuration of the piezoelectric actuator.

FIG. 5 is a perspective view showing a configuration of the piezoelectric actuator 30. The piezoelectric actuator 30 includes a main body part 39 having the piezoelectric element 32, the tip end portion 33 coupled to the main body part 39, a first parallel spring part 60 that urges the main body part 39 toward the rotor 40, and a second parallel spring part 70 that urges the main body part 39 toward the rotor 40 with the first parallel spring part 60.

The main body part 39 is placed between the first parallel spring part 60 and the second parallel spring part 70. The main body part 39 includes the piezoelectric element 32, a first vibrating plate 81, a second vibrating plate 82, and a first interlayer member 85. The piezoelectric element 32 is provided between the first vibrating plate 81 and the second vibrating plate 82. The first interlayer member 85 is provided to fill the gap between the first vibrating plate 81 and the second vibrating plate 82.

The piezoelectric element 32 includes a piezoelectric material with electrodes provided on both surfaces thereof. In the embodiment, the piezoelectric material is formed using lead zirconate titanate. The piezoelectric material may be formed using e.g. barium titanate or quartz crystal, not lead zirconate titanate. The electrodes are coupled to a power supply via switching elements by wires (not shown).

The first vibrating plate 81 and the second vibrating plate 82 have the same shape. The first vibrating plate 81 and the second vibrating plate 82 are formed using silicon. The piezoelectric element 32 and the first vibrating plate 81 as well as the piezoelectric element 32 and the second vibrating plate 82 are bonded using insulating adhesives. The interlayer member 85 is formed using silicon. The interlayer member 85 and the first vibrating plate 81 as well as the interlayer member 85 and the second vibrating plate 82 are bonded using insulating adhesives.

The tip end portion 33 is bonded to the main body part 39 using an insulating adhesive. It is preferable that the tip end portion 33 is formed using a material having high wear resistance. In the embodiment, the tip end portion 33 is formed using alumina.

The first parallel spring part 60 has a first non-spring portion 61, a second non-spring portion 62, and a plurality of first leaf spring portions 63 coupling between the first non-spring portion 61 and the second non-spring portion 62. In the embodiment, the six first leaf spring portions 63 couple between the first non-spring portion 61 and the second non-spring portion 62. The first non-spring portion 61 and the second non-spring portion 62 are portions harder to be deformed along the X direction in the first parallel spring part 60. The first leaf spring portions 63 are portions easier to be deformed along the X direction in the first parallel spring part 60. The first leaf spring portions 63 each extend in parallel to one another toward the Y direction. The first leaf spring portions 63 are each placed to face the main body part 39 in the Z direction.

The second parallel spring part 70 has a third non-spring portion 71, a fourth non-spring portion 72, and a plurality of second leaf spring portions 73 coupling between the third non-spring portion 71 and the fourth non-spring portion 72. The third non-spring portion 71 and the fourth non-spring portion 72 are portions harder to be deformed along the X direction in the second parallel spring part 70. The second leaf spring portions 73 are portions easier to be deformed along the X direction in the second parallel spring part 70. The second leaf spring portions 73 each extend in parallel to one another toward the Y direction. The second leaf spring portions 73 are each placed to face the main body part 39 in the Z direction. In the embodiment, the second parallel spring part 70 has a symmetrical shape to the first parallel spring part 60 with the main body part 39 in between.

The first parallel spring part 60 and the second parallel spring part 70 are each formed using silicon. The first non-spring portion 61, the second non-spring portion 62, and the first leaf spring portions 63 in the first parallel spring part 60 may be formed using dry etching on plate-like silicon. The third non-spring portion 71, the fourth non-spring portion 72, and the second leaf spring portions 73 in the second parallel spring part 70 may be formed using dry etching on plate-like silicon.

A third vibrating plate 83, a second interlayer member 86, and a fourth vibrating plate 84 are sequentially provided from the second non-spring portion 62 toward the fourth non-spring portion 72 between the second non-spring portion 62 of the first parallel spring part 60 and the fourth non-spring portion 72 of the second parallel spring part 70. The third vibrating plate 83 and the fourth vibrating plate 84 have the same shape. The third vibrating plate 83 and the fourth vibrating plate 84 are formed using silicon. The thickness of the third vibrating plate 83 along the Z direction is the same as the thickness of the first vibrating plate 81 along the Z direction. The thickness of the fourth vibrating plate 84 along the Z direction is the same as the thickness of the second vibrating plate 82 along the Z direction. The second interlayer member 86 is formed using silicon. The thickness of the second interlayer member 86 along the Z direction is the same as the thickness of the first interlayer member 85 along the Z direction.

Two attachment holes 38 into which fixing screws 90 for fixing the piezoelectric actuator 30 to the holding member 36 are inserted are provided in the second non-spring portion 62 and the fourth non-spring portion 72. The attachment holes 38 are provided to penetrate the first parallel spring part 60, the third vibrating plate 83, the second interlayer member 86, the fourth vibrating plate 84, and the second parallel spring part 70.

Figure 6:
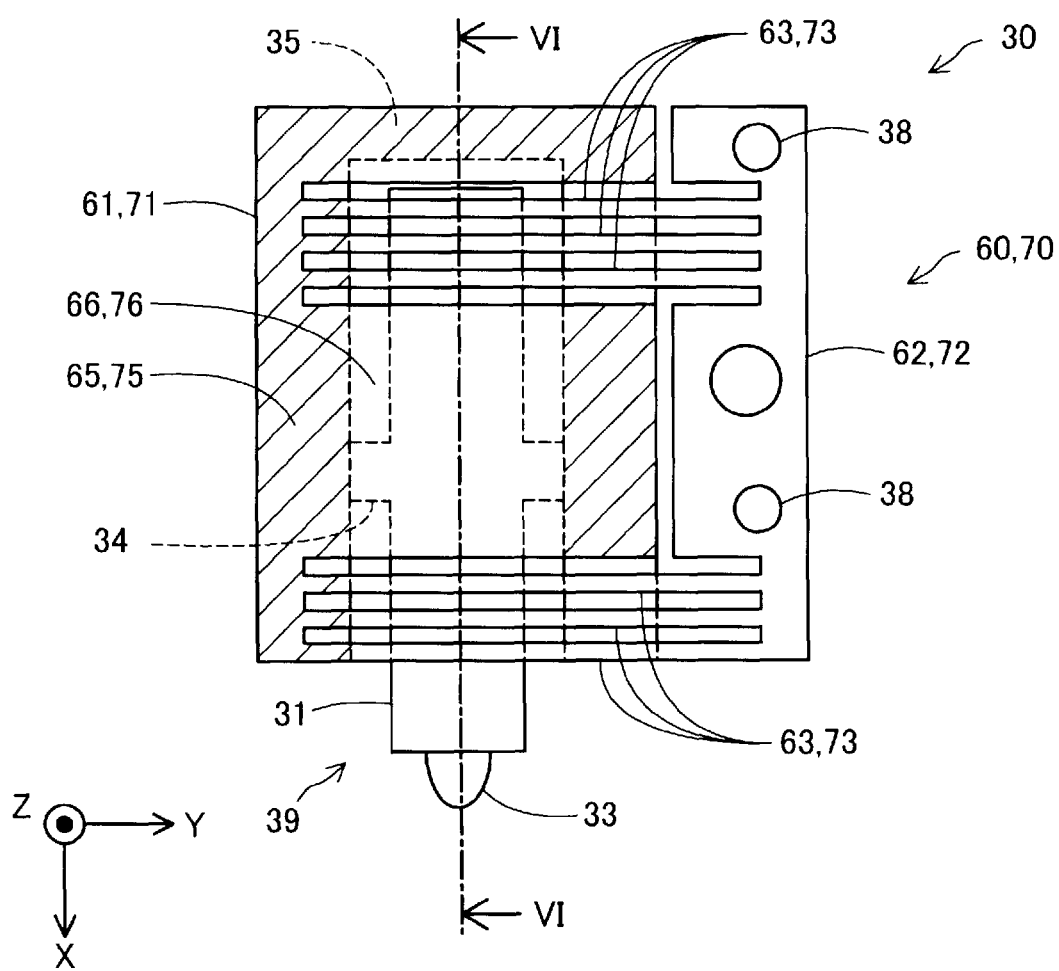
FIG. 6 is a plan view showing the configuration of the piezoelectric actuator.

FIG. 6 is a plan view showing the configuration of the piezoelectric actuator 30. The main body part 39 has a vibrating portion 31, a supporting portion 34, and an arm portion 35. The vibrating portion 31 is a portion having the piezoelectric element 32. The shape of the vibrating portion 31 as seen from the first parallel spring part 60 toward the second parallel spring part 70 is a rectangular shape in a longitudinal direction along the X direction. The tip end portion 33 is coupled to the center of one short side of the vibrating portion 31. The arm portion 35 is a portion facing the other short side of the vibrating portion 31 and both long sides of the vibrating portion 31. The supporting portion 34 is a portion coupling between the centers of the long sides of the vibrating portion 31 and the arm portion 35.

The first non-spring portion 61 of the first parallel spring part 60 has a first thick portion 65 and a first thin portion 66. The thickness of the first thin portion 66 along the Z direction is smaller than the thickness of the first thick portion 65 along the Z direction. The first thick portion 65 is provided in a region facing the arm portion 35. In FIG. 6, the region in which the first thick portion 65 is provided is hatched. The first thin portion 66 is provided in a region facing the vibrating portion 31 and the supporting portion 34 in the first non-spring portion 61. The first thick portion 65 is bonded to the arm portion 35 using an insulating adhesive. The first thin portion 66 has a predetermined distance along the Z direction between each of the vibrating portion 31 and the supporting portion 34 and itself.

The third non-spring portion 71 of the second parallel spring part 70 has a second thick portion 75 and a second thin portion 76. The thickness of the second thin portion 76 along the Z direction is smaller than the thickness of the second thick portion 75 along the Z direction. The second thick portion 75 is provided in a region facing the arm portion 35. In FIG. 6, the region in which the second thick portion 75 is provided is hatched. The second thin portion 76 is provided in a region facing the vibrating portion 31 and the supporting portion 34 in the third non-spring portion 71. The second thick portion 75 is bonded to the arm portion 35 using an insulating adhesive. The second thin portion 76 has a predetermined distance along the Z direction between each of the vibrating portion 31 and the supporting portion 34 and itself.

Figure 7:
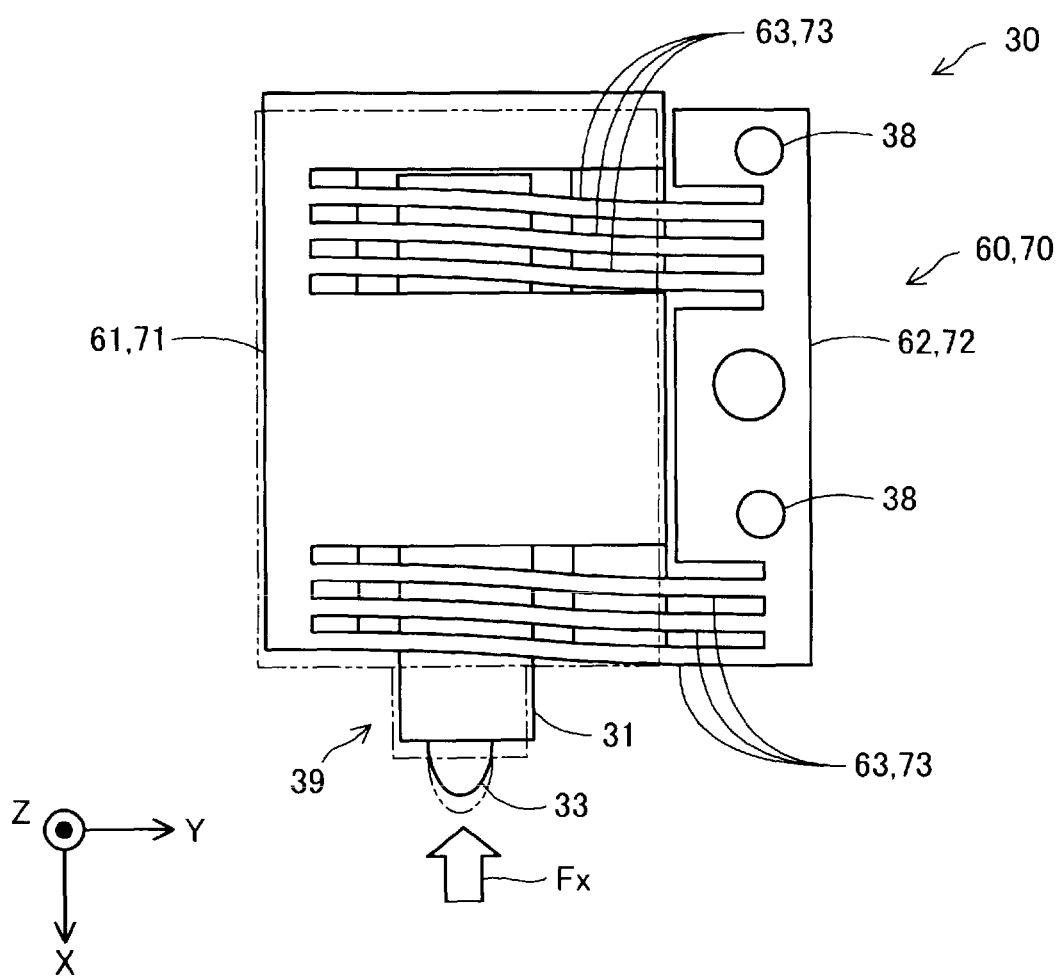
FIG. 7 is an explanatory diagram showing deformation of a first parallel spring part and a second parallel spring part.

FIG. 7 is an explanatory diagram showing deformation of the first parallel spring part 60 and the second parallel spring part 70. The first parallel spring part 60 functions as a parallel spring mechanism for a load along the X direction. The second parallel spring part 70 functions as a parallel spring mechanism for a load along the X direction like the first parallel spring part 60. For example, as shown in FIG. 7, when the tip end portion 33 is subjected to a load Fx toward the −X direction, the first non-spring portion 61 and the third non-spring portion 71 are pressed in the −X direction via the main body part 39. The first non-spring portion 61 and the third non-spring portion 71 are pressed in the −X direction, and thereby, the respective first leaf spring portions 63 bend toward the −X direction while keeping the parallel states to each other and the respective second leaf spring portions 73 bend toward the −X direction while keeping the parallel states to each other. The first non-spring portion 61 translationally moves toward the −X direction according to the amount of bend of the first leaf spring portions 63 in the −X direction without rotating relative to the second non-spring portion 62, and translationally moves toward the +Y direction according to the amount of movement in the +Y direction of the coupling portions of the first leaf spring portions 63 and the first non-spring portion 61 associated with bending of the first leaf spring portions 63. The third non-spring portion 71 translationally moves toward the −X direction according to the amount of bend of the second leaf spring portions 73 in the −X direction without rotating relative to the fourth non-spring portion 72, and translationally moves toward the +Y direction according to the amount of movement in the +Y direction of the coupling portions of the second leaf spring portions 73 and the first non-spring portion 71 associated with bending of the second leaf spring portions 73. Note that, in FIG. 7, the positions of the first parallel spring part 60 and the second parallel spring part 70 before the movement are shown by dashed-two dotted lines. The first non-spring portion 61, the second non-spring portion 62, the third non-spring portion 71, and the fourth non-spring portion 72 are hardly deformed. The second non-spring portion 62 and the fourth non-spring portion 72 are fixed to the holding member 36 and do not move relative to the holding member 36. That is, the load Fx may be adjusted by the distance in the axial direction AD between the second step portion 23 and the holding member 36. Here, the load Fx is synonymous with the urging force of the piezoelectric actuator 30.

Figure 8:
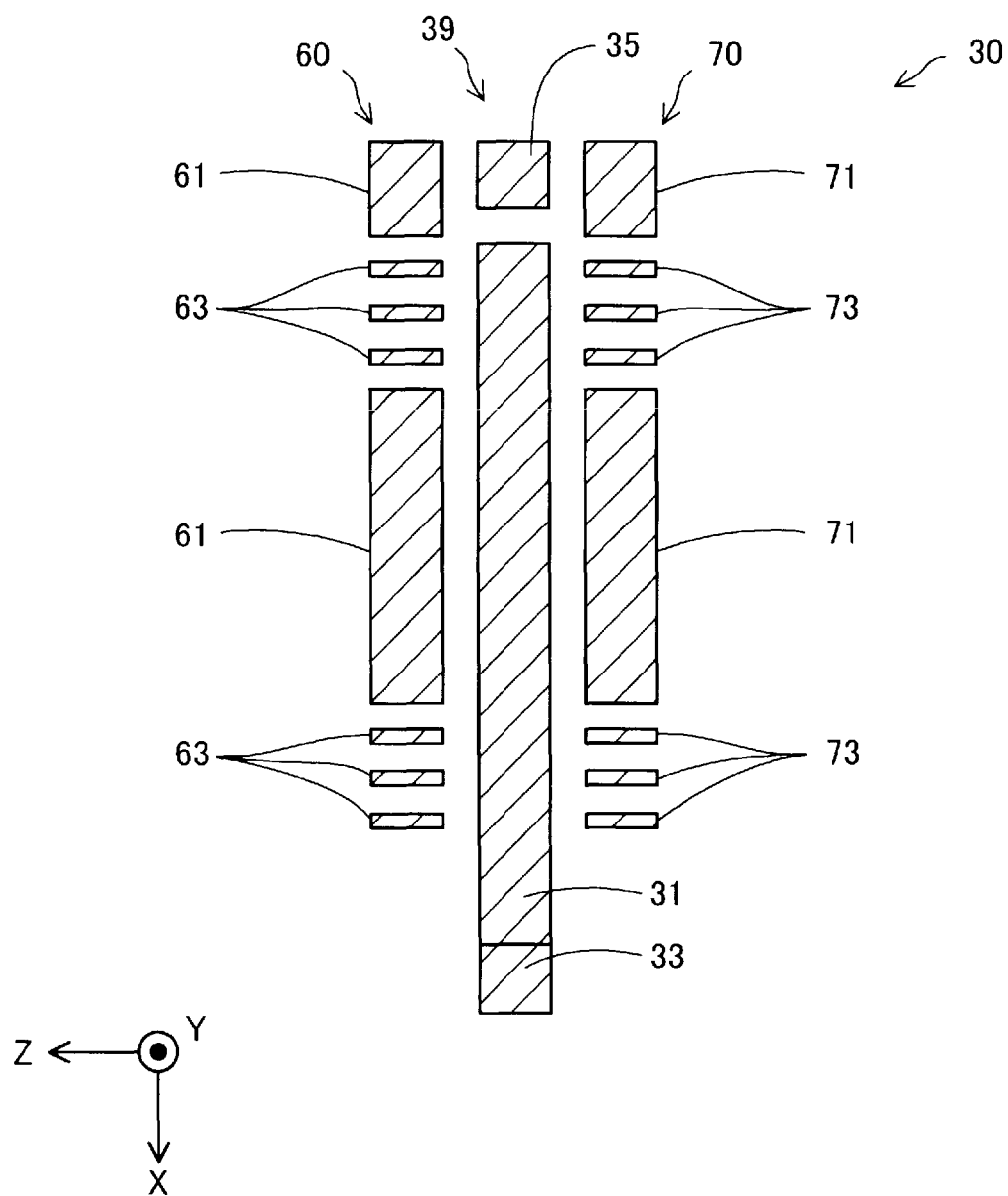
FIG. 8 is a sectional view of the piezoelectric actuator.

FIG. 8 is a sectional view of the piezoelectric actuator 30 along line VI-VI in FIG. 6. In the embodiment, the sectional shape of the first leaf spring portions 63 and the sectional shape of the second leaf spring portions 73 are rectangular sectional shapes. Note that the sectional shape of the first leaf spring portions 63 and the sectional shape of the second leaf spring portions 73 are not limited to the rectangular shapes, and the width of a part farther from the main body part 39 in the X direction may be larger than the width of a part closer to the main body part 39 in the X direction. Thereby, the deformation of the first parallel spring part 60 and the second parallel spring part 70 in the Z direction may be suppressed. Accordingly, displacement of the position of the main body part 39 in the Z direction may be suppressed and driving of the rotor 40 may be stabilized.

Figure 9:
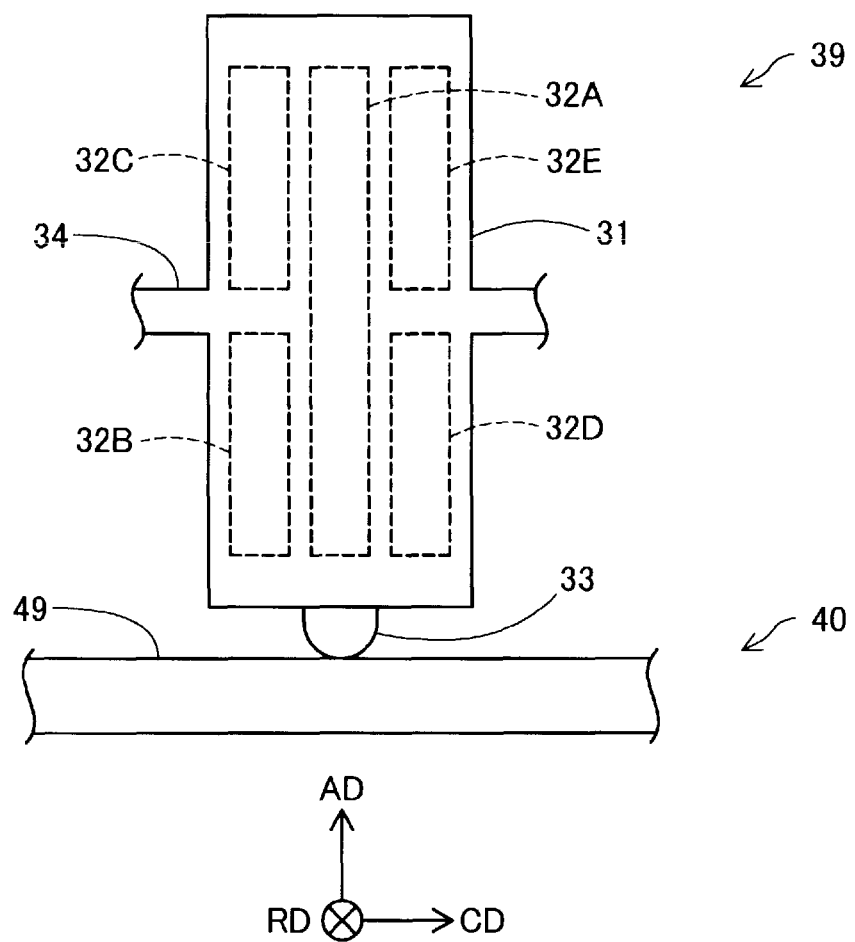
FIG. 9 is an explanatory diagram showing a configuration of a vibrating portion.

FIG. 9 is an explanatory diagram showing a configuration of the vibrating portion 31. In the embodiment, the vibrating portion 31 has a first piezoelectric element 32A, a second piezoelectric element 32B, a third piezoelectric element 32C, a fourth piezoelectric element 32D, and a fifth piezoelectric element 32E. The respective piezoelectric elements 32A to 32E are placed along the longitudinal direction of the vibrating portion 31. In FIG. 9, the first piezoelectric element 32A is placed at the center of the vibrating portion 31. The second piezoelectric element 32B and the third piezoelectric element 32C are placed at the left side of the first piezoelectric element 32A. The second piezoelectric element 32B is placed at the downside of the supporting portion 34. The third piezoelectric element 32C is placed at the upside of the supporting portion 34. The fourth piezoelectric element 32D and the fifth piezoelectric element 32E are placed at the right side of the first piezoelectric element 32A. The fourth piezoelectric element 32D is placed at the downside of the supporting portion 34. The fifth piezoelectric element 32E is placed at the upside of the supporting portion 34.

Figure 10:
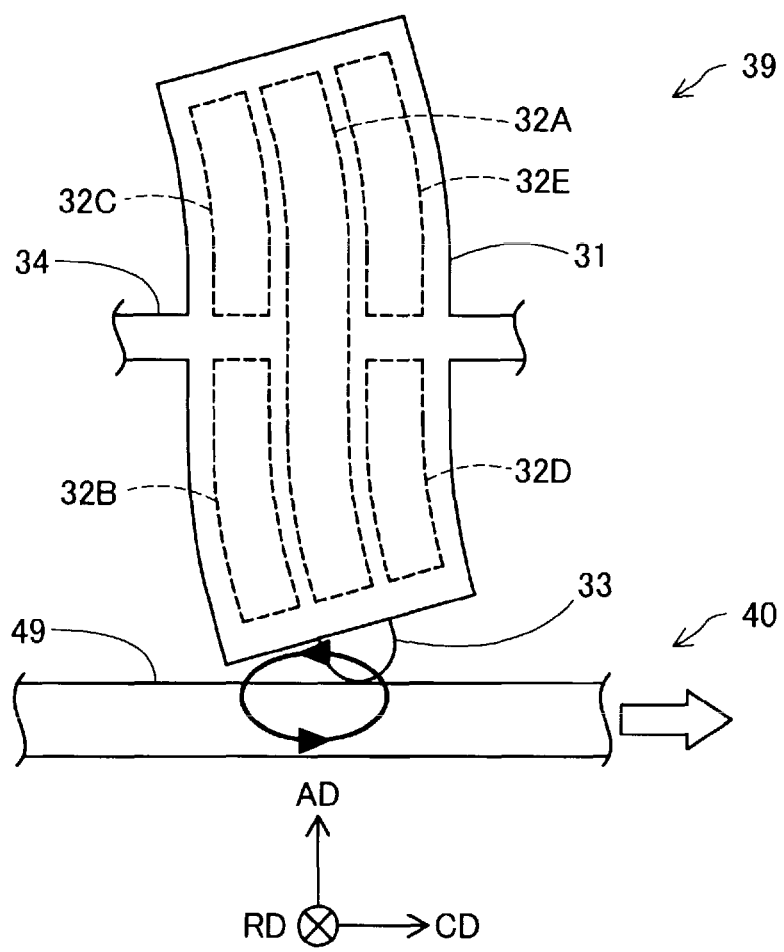
FIG. 10 is an explanatory diagram showing motion of the vibrating portion.

FIG. 10 is an explanatory diagram showing motion of the vibrating portion 31. The phase of the alternating-current voltage supplied to the second piezoelectric element 32B and the fifth piezoelectric element 32E and the phase of the alternating-current voltage supplied to the third piezoelectric element 32C and the fourth piezoelectric element 32D are set to be different by 180 degrees and the phase of the alternating-current voltage supplied to the first piezoelectric element 32A and the phase of the alternating-current voltage supplied to the second piezoelectric element 32B and the fifth piezoelectric element 32E are set to be different by e.g. 90 degrees, and thereby, the vibrating portion 31 may be two-dimensionally deformed and make elliptic motion of the tip end portion 33. Concurrently, the vibrating portion 31 is deformed at nodes in the coupling portions to the supporting portion 34. The tip end portion 33 repeats the elliptic motion, and thereby, the tip end portion 33 and the contacted surface 49 of the rotor 40 repeatedly contact. When the tip end portion 33 and the contacted surface 49 contact, the tip end portion 33 transmits the drive force along the circumferential direction CD to the rotor 40. Accordingly, while the tip end portion 33 repeats the elliptic motion, the rotor 40 rotates around the center axis RX. In the embodiment, when the tip end portion 33 and the contacted surface 49 contact, the tip end portion 33 is urged toward the contacted surface 49, and thereby, the tip end portion 33 may efficiently transmit the drive force along the circumferential direction CD to the rotor 40. Note that the alternating-current voltages supplied to the above described respective piezoelectric elements 32A to 32E are inverted by 180 degrees, and thereby, the rotor 40 may be reversely rotated.

According to the above described piezoelectric motor 100, the relative positions of the first positioning pin 901 and the first hole portion 911 are fixed by the first fixing part 910, and thereby, the urging force may be maintained and stable output may be generated as the piezoelectric motor 100.

Further, in the embodiment, the relative positions of the first positioning pin 901 and the first hole portion 911 are fixed by the first fixing part 910, and thereby, the gap produced between the first positioning pin 901 and the first hole portion 911 is eliminated. Therefore, unwanted vibration generated within the range of rattling is not generated and reduction of the drive force of the piezoelectric motor 100 may be prevented.

Further, in the embodiment, the gap produced between the first positioning pin 901 and the first hole portion 911 is eliminated, and thereby, the degree of freedom in the rotation direction generated within the range of rattling is reduced. That is, the posture of the piezoelectric actuator 30 with respect to the contacted surface 49 is stabilized and the difference between the forward and backward rotations of the rotor 40 may be reduced.

In the embodiment, the fixation of the first positioning pin 901 and the first hole portion 911 may be released by loosening of the first male screw 903 and the second male screw 904. Therefore, adjustment of the urging force of the piezoelectric actuator 30 and disassembly of the piezoelectric motor 100 are easier.

When the first fixing part 910 contains adhesives, fillings, or the like, not the first male screw 903 and the second male screw 904, in addition to the effect of preventing unwanted vibration and the effect of stabilizing the posture of the piezoelectric actuator 30, the number of parts is reduced and thereby assembly of the piezoelectric motor 100 is easier.

In the embodiment, the second positioning pin 902 and the fourth hole portion 921 are provided, and thereby, when the piezoelectric actuator 30 is attached to the housing 20, the direction of the drive force of the piezoelectric actuator 30 may be easily aligned with the tangential direction of the rotor 40. Therefore, assembly of the piezoelectric motor 100 with less torque loss is easier.

Further, in the embodiment, the gap produced between the second positioning pin 902 and the fourth hole portion 921 is eliminated, and thereby, the degree of freedom in the rotation direction generated within the range of rattling is further reduced. That is, the posture of the piezoelectric actuator 30 with respect to the contacted surface 49 is stabilized and thereby the difference between the forward and backward rotations of the rotor 40 may be further reduced.

Furthermore, in the embodiment, the fixation of the second positioning pin 902 and the fourth hole portion 921 may be released by loosening of the third male screw 905. Therefore, the adjustment of the urging force of the piezoelectric actuator 30 and the disassembly of the piezoelectric motor 100 are easier.

2. Embodiment 2

Figure 11:
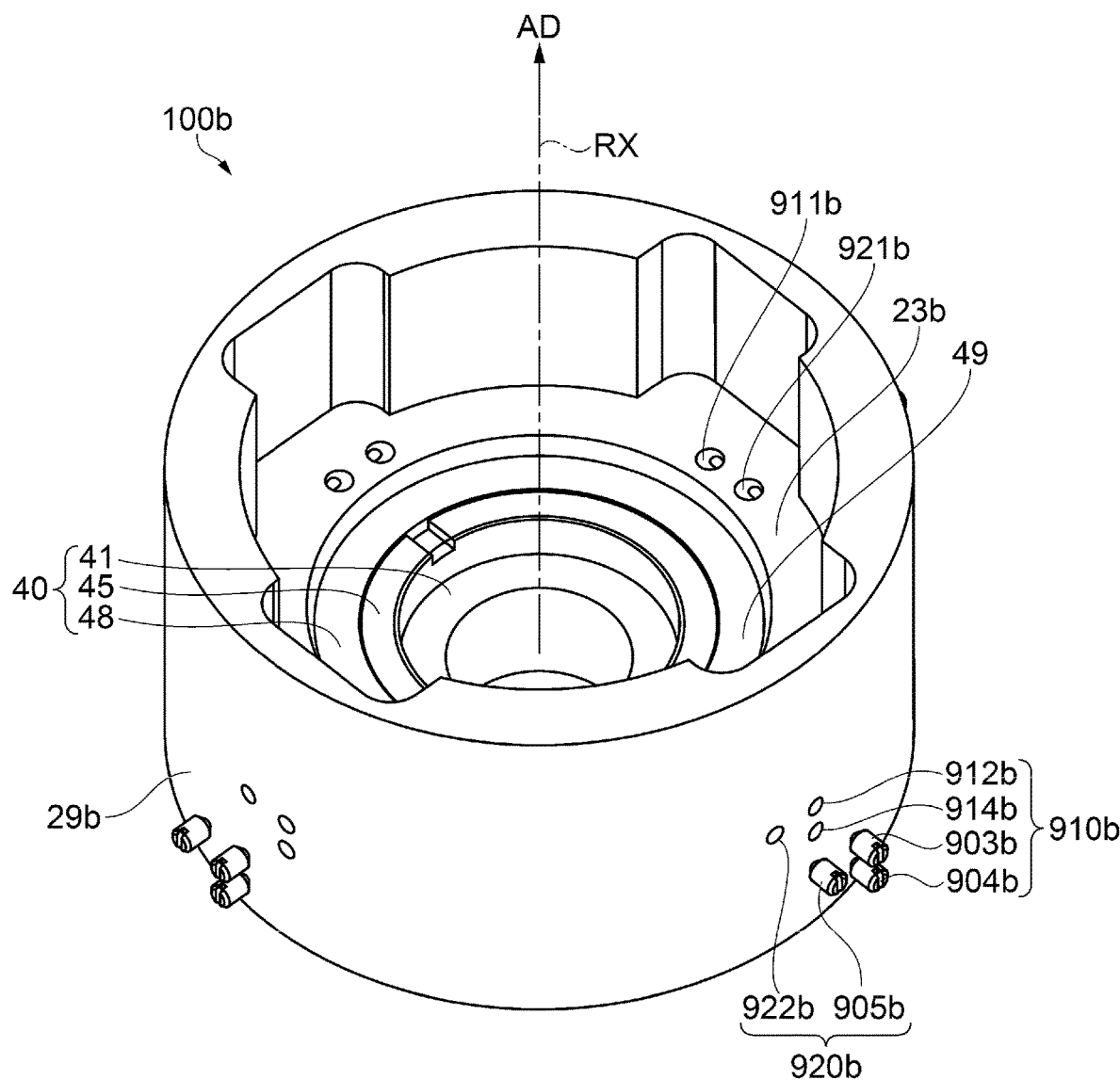
FIG. 11 is a perspective view of a piezoelectric motor in Embodiment 2 as seen from above.

FIG. 11 is a perspective view of a piezoelectric motor 100b in Embodiment 2 as seen from above. Here, the lid part 28, the piezoelectric actuator 30, and a holding member 36b are not shown. In the piezoelectric motor 100b of Embodiment 2, configurations of a lower case 29b and the holding member 36b and placement of a first positioning pin 901b and a second positioning pin 902b are different from those of Embodiment 1. The other configurations are the same as those of Embodiment 1 shown in FIGS. 1 to 10 unless otherwise stated.

In a second step portion 23b of the lower case 29b, a single first hole portion 911b in which the first positioning pin 901b is to be placed and a single fourth hole portion 921b in which the second positioning pin 902b is to be placed are formed for each piezoelectric actuator 30. The center axis of the first hole portion 911b and the center axis of the fourth hole portion 921b are each parallel to the axial direction AD.

In the lower case 29b, a second hole portion 912b communicating with the first hole portion 911b from the outer circumferential surface of the lower case 29b is formed. A female thread is formed in the inner circumferential surface of the second hole portion 912b. To the inside of the second hole portion 912b, a first male screw 903b as a first screw portion is attached. Further, in the embodiment, in the lower case 29b, a third hole portion 914b communicating with the first hole portion 911b from the outer circumferential surface of the lower case 29b is formed. A female thread is formed in the inner circumferential surface of the third hole portion 914b. To the inside of the third hole portion 914b, a second male screw 904b as a second screw portion is attached. The second hole portion 912b, the first male screw 903b, the third hole portion 914b, and the second male screw 904b function as a first fixing part 910b that fixes the first positioning pin 901b. Furthermore, in the embodiment, in the lower case 29b, a fifth hole portion 922b communicating with the fourth hole portion 921b from the outer circumferential surface of the lower case 29b is formed. A female thread is formed in the inner circumferential surface of the fifth hole portion 922b. To the inside of the fifth hole portion 922b, a third male screw 905b as a third screw portion is attached. The fifth hole portion 922b and the third male screw 905b function as a second fixing part 920b that fixes the second positioning pin 902b.

Figure 12:
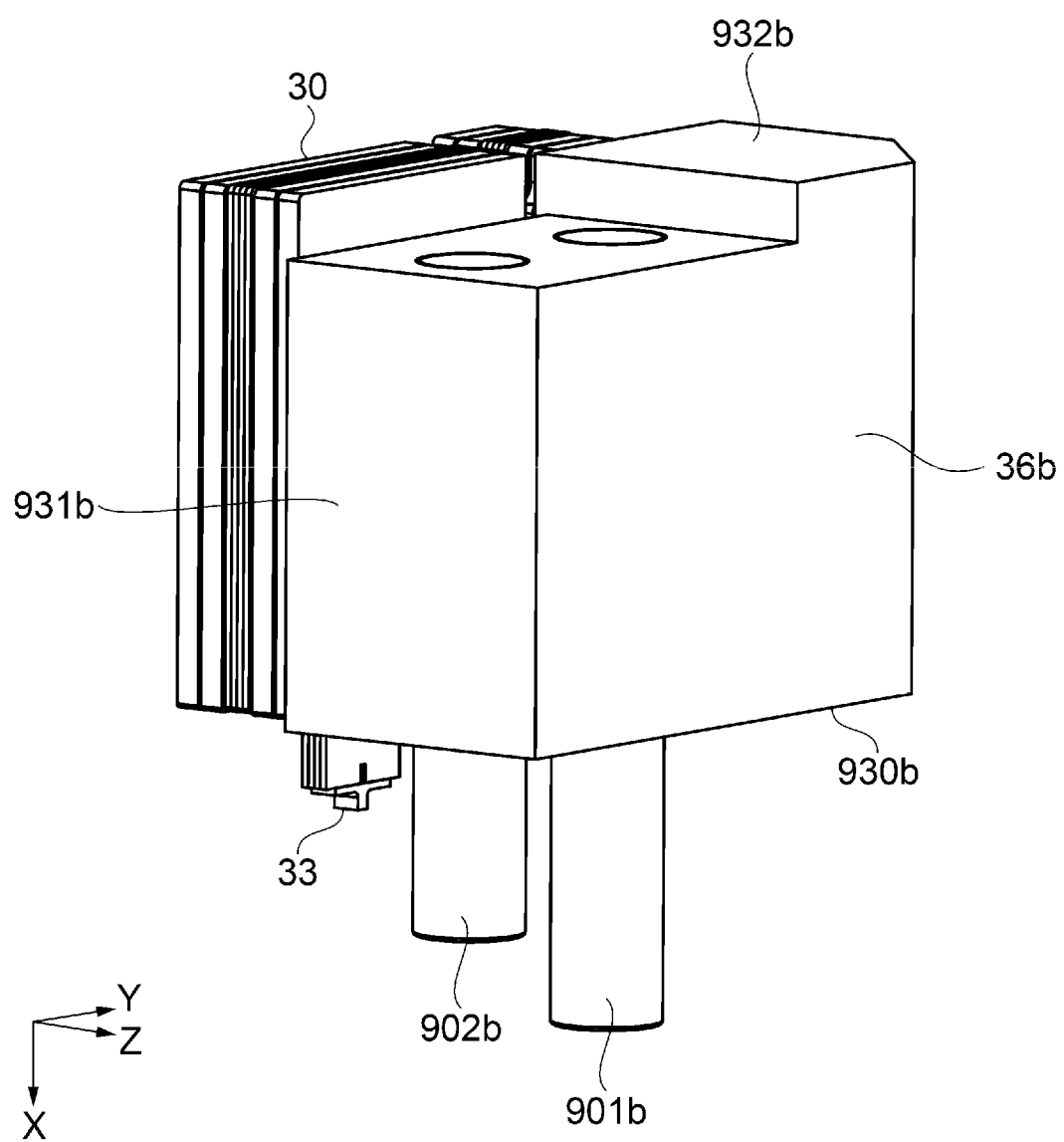
FIG. 12 is a perspective view of a piezoelectric actuator and a holding member in Embodiment 2 as seen from above.

FIG. 12 is a perspective view of the piezoelectric actuator 30 and the holding member 36b in Embodiment 2 as seen from above. Arrows along X, Y, Z directions orthogonal to one another are shown in FIG. 12. The X direction is a direction parallel to the axial direction AD shown in FIGS. 1 and 2, and the Z direction is a direction parallel to the radial direction RD shown in FIGS. 1 and 2.

The holding member 36b has a double stepped shape. With a bottom surface 930b parallel to the YZ plane as a common bottom surface, a first step portion 931b and a second step portion 932b are sequentially placed toward the +Y direction. In the embodiment, the second step portion 932b is higher than the first step portion 931b. The piezoelectric actuator 30 is fixed to the second step portion 932b. The height of the first step portion 931b is lower than the height of the second step portion 932b, and thereby, the step portions do not interfere with wiring (not shown) of the piezoelectric actuator 30.

The first step portion 931b has the single first positioning pin 901b and the single second positioning pin 902b. The center axis of the first positioning pin 901b and the center axis of the second positioning pin 902b are each parallel to the X direction. In the embodiment, a hole having a diameter slightly smaller than the diameter of the first positioning pin 901b is bored in the first step portion 931b and the first positioning pin 901b is driven and fixed in the hole with a hammer or the like. That is, the first positioning pin 901b is fixed into the first step portion 931b by interference fit. The second positioning pin 902b is also fixed into the first step portion 931b by interference fit like the first positioning pin 901b. Note that the fixing method is not limited to driving, and includes using an adhesive, using a filling, or screwing by a male thread and a female thread. Or, the first positioning pin 901b and the second positioning pin 902b may be integrally molded with the holding member 36b, not separately formed from the holding member 36b.

The diameter of the first positioning pin 901b is slightly smaller than the diameter of the first hole portion 911b. Further, the diameter of the second positioning pin 902b is slightly smaller than the diameter of the fourth hole portion 921b. In addition in both directions of the Y direction and the Z direction, the relative positions of the first positioning pin 901b and the second positioning pin 902b are equal to the relative positions of the first hole portion 911b and the fourth hole portion 921b. That is, the first positioning pin 901b is inserted into the first hole portion 911b and the second positioning pin 902b is inserted into the fourth hole portion 921b, and thereby, the holding member 36b may be coupled to the lower case 29 movably forward and backward in the X direction. Furthermore, the length of the first positioning pin 901b projecting from the bottom surface 930b is longer than the length of the second positioning pin 902b projecting from the bottom surface 930b. Thereby, an influence by double-fit when both the first positioning pin 901b and the second positioning pin 902b are inserted into both the first hole portion 911b and the fourth hole portion 921b may be reduced. That is, a potential that the first positioning pin 901b and the second positioning pin 902b not strictly in parallel are caught by and not entered into the first hole portion 911b and the fourth hole portion 921b also not strictly in parallel may be reduced. Here, the first positioning pin 901b and the second positioning pin 902b do not project toward the upside of the first step portion 931b. Thereby, the pins do not interfere with wiring (not shown) of the piezoelectric actuator 30.

When the holding member 36b with the piezoelectric actuator 30, the first positioning pin 901b, and the second positioning pin 902b attached thereto in advance is coupled to the lower case 29b, the tip end portion 33 of the piezoelectric actuator 30 contacts the contacted surface 49 of the rotor 40 and an urging force is generated. The urging force is essential to operate the piezoelectric motor 100b by the piezoelectric actuator 30, but, the holding member 36b is movable forward and backward in the X direction relative to the lower case 29b and thereby the urging force is not maintained as it is. Accordingly, in the embodiment, the first positioning pin 901b is pressed against the first hole portion 911b and tightened up by the first male screw 903b and the second male screw 904b, and thereby, the relative positions of the first positioning pin 901b and the first hole portion 911b are fixed. That is, the first fixing part 910b fixes the relative positions of the first positioning pin 901b and the first hole portion 911b. Thereby, the urging force may be maintained. In addition, unwanted vibration generated by the gap between the first positioning pin 901b and the first hole portion 911b may be suppressed and reduction of the drive force by the piezoelectric motor 100b may be prevented. Further, the degree of freedom of the holding member 36b in the rotation direction generated by the gap between the first positioning pin 901b and the first hole portion 911b and the gap between the second positioning pin 902b and the second hole portion 912b may be restricted in the two directions about the Y-axis and the Z-axis. That is, rattling may be reduced and the posture of the piezoelectric actuator 30 may be stabilized. Furthermore, in the embodiment, the second positioning pin 902b is pressed against the fourth hole portion 921b and tightened up by the third male screw 905b, and thereby, the relative positions of the second positioning pin 902b and the fourth hole portion 921b are fixed. That is, the second fixing part 920b fixes the relative positions of the second positioning pin 902b and the fourth hole portion 921b. Thereby, of the degrees of freedom in the above described rotation directions, the remaining direction about the X-axis may be restricted. That is, the rattling may be further reduced and the posture of the piezoelectric actuator 30 may be further stabilized. Note that, in the embodiment, the fixation of the relative positions of the first positioning pin 901b and the first hole portion 911b is realized by tightening of the first male screw 903b and the second male screw 904b and the fixation of the relative positions of the second positioning pin 902b and the fourth hole portion 921b is realized by tightening of the third male screw 905b, but, the fixation may be realized by placement of adhesives, fillings, or the like within the first hole portion 911b and the fourth hole portion 921b. That is, these adhesives, fillings, or the like contact both the first positioning pin 901b and the first hole portion 911b and contact both the second positioning pin 902b and the fourth hole portion 921b, and thereby, the respective relative positions are fixed. In this case, the first fixing part 910b and the second fixing part 920b contain those adhesives, fillings, or the like.

According to the above descried piezoelectric motor 100b of the embodiment, the same effects as those of Embodiment 1 may be obtained.

3. Embodiment 3

Though not shown in the drawings, a piezoelectric motor 100c of the embodiment has a configuration as a mixture of Embodiment 1 and Embodiment 2. Specifically, the first positioning pin is fixed to the lower case and the second positioning pin is fixed to the holding member. Further, the first hole portion for insertion of the first positioning pin is formed in the holding member, and the fourth hole portion for insertion of the second positioning pin is formed in the lower case. According to the configuration, the same effects as those of Embodiments 1, 2 may be obtained.

4. Embodiment 4

Figure 13:
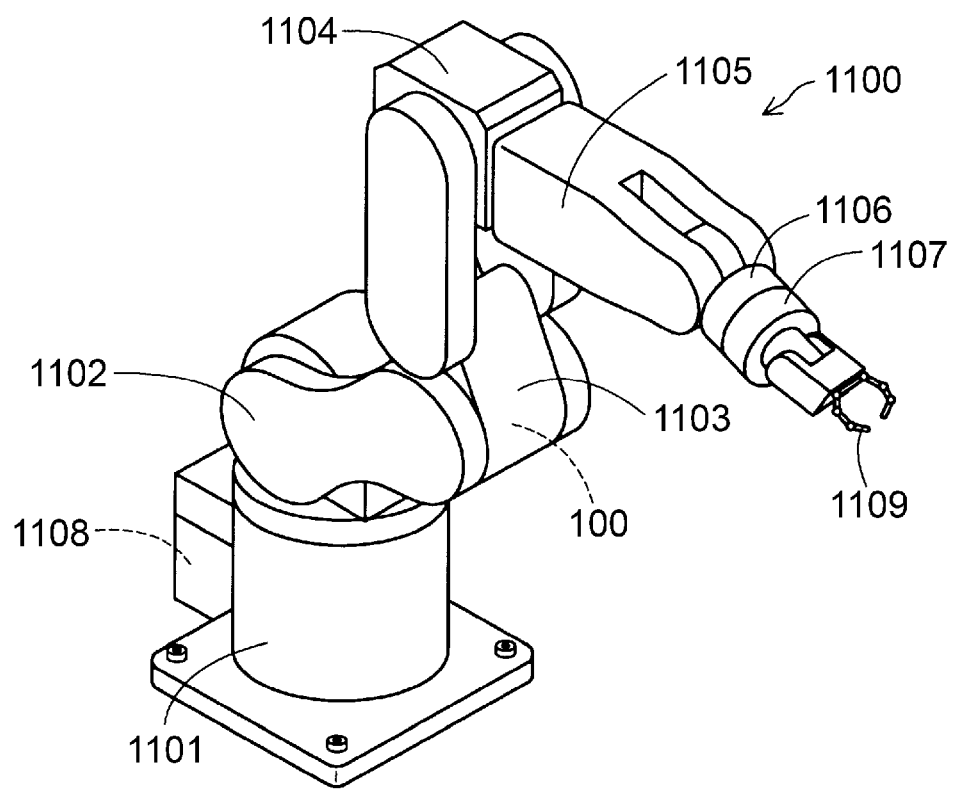
FIG. 13 is a perspective view showing a schematic configuration of a robot in Embodiment 4.

FIG. 13 is a perspective view showing a schematic configuration of a robot 1100 in Embodiment 4. The robot 1100 in the embodiment may perform work of feeding, removal, transport, and assembly of precision apparatuses and components forming the apparatuses. The robot 1100 is a six-axis robot, and has a base 1101 fixed to a floor or a ceiling, a first arm 1102 rotatably coupled to the base 1101, a second arm 1103 rotatably coupled to the first arm 1102, a third arm 1104 rotatably coupled to the second arm 1103, a fourth arm 1105 rotatably coupled to the third arm 1104, a fifth arm 1106 rotatably coupled to the fourth arm 1105, a sixth arm 1107 rotatably coupled to the fifth arm 1106, and a robot control unit 1108 that controls driving of the respective arms 1102, 1103, 1104, 1105, 1106, 1107. A hand coupling portion is provided in the sixth arm 1107 and an end effector 1109 according to work to be executed by the robot 1100 is attached to the hand coupling portion. The piezoelectric motor 100 explained in Embodiment 1 is provided in part or all of the respective joint portions, and the respective arms 1102, 1103, 1104, 1105, 1106, 1107 rotate by driving of the piezoelectric motors 100. Driving of the respective piezoelectric motors 100 is controlled by the robot control unit 1108. Note that the robot 1000 is not limited to the six-axis robot, and may be a robot having five or less axes or seven or more axes. FIG. 13 shows a vertical articulated robot, but the robot 1000 may be a horizontal articulated robot.

The robot control unit 1108 includes a computer having one or more processors, a main memory device, and an input/output interface for performing input and output of signals to and from the outside. In the embodiment, the robot control unit 1108 controls operation of the robot 1100 by executing programs and commands read on the main memory device using the processor. Note that the robot control unit 1108 may be configured by a combination of a plurality of circuits, not by a computer.

According to the above described robot 1100 of the embodiment, the piezoelectric motors 100 explained in Embodiment 1 are used for the joint portions, and thereby drive forces are not lost by unwanted vibration. Therefore, the drive forces for driving the respective arms 1102, 1103, 1104, 1105, 1106, 1107 may be efficiently supplied. Note that the robot 1100 may include the piezoelectric motors 100b explained in Embodiment 2 or the piezoelectric motors 100c explained in Embodiment 3 in place of the piezoelectric motors 100.

What is claimed is:

1. A piezoelectric motor comprising:
   a vibrator;
   a holding unit that holds the vibrator;
   a housing in which the vibrator and the holding unit are placed;
   a first positioning pin that positions the holding unit and the housing; and
   a first fixing part that fixes the first positioning pin, wherein
   the first positioning pin is fixed to one of the holding unit and the housing,
   a first hole portion in which the first positioning pin is placed is provided in the other of the holding unit and the housing, and
   the first fixing part fixes relative positions of the first hole portion and the first positioning pin.

2. The piezoelectric motor according to claim 1, wherein
   a second hole portion communicating with the first hole portion is provided in the other of the holding unit and the housing, and
   the first fixing part has a first screw portion placed inside of the second hole portion and pressing the first positioning pin against the first hole portion.

3. The piezoelectric motor according to claim 2, wherein
   a third hole portion communicating with the first hole portion is provided in the other of the holding unit and the housing, and
   the first fixing part has a second screw portion placed inside of the third hole portion and pressing the first positioning pin against the first hole portion.

4. The piezoelectric motor according to claim 1, wherein
   the first fixing part is placed inside of the first hole portion and contacts both the first hole portion and the first positioning pin.

5. The piezoelectric motor according to claim 1, further comprising:
   a second positioning pin that positions the holding unit and the housing; and
   a second fixing part that fixes the second positioning pin, wherein
   the second positioning pin is fixed to the one of the holding unit and the housing,
   a fourth hole portion in which the second positioning pin is placed is provided in the other of the holding unit and the housing, and
   the second fixing part fixes relative positions of the fourth hole portion and the second positioning pin.

6. The piezoelectric motor according to claim 5, wherein
   a fifth hole portion communicating with the fourth hole portion is provided in the other of the holding unit and the housing, and
   the second fixing part has a third screw portion placed inside of the fifth hole portion and pressing the second positioning pin against the fourth hole portion.

7. A robot comprising the piezoelectric motor according to claim 1.

* * * * *